United States Patent [19]

Sandusky Donald A.

[11] Patent Number: 5,395,477
[45] Date of Patent: Mar. 7, 1995

[54] APPARATUS FOR CONSOLIDATING A PRE-IMPREGNATED, FILAMENT-REINFORCED POLYMERIC PREPREG MATERIAL

[75] Inventor: Sandusky Donald A., Williamsburg, Va.

[73] Assignee: The United States of America as represented by the Administrator of the National Aeronautics and Space Administration, Washington, D.C.

[21] Appl. No.: 141,292

[22] Filed: Oct. 20, 1993

[51] Int. Cl.⁶ .................. B29B 11/16; B29B 15/14; B29K 105/08
[52] U.S. Cl. ..................... 156/441; 156/180; 156/181; 156/433; 118/124; 264/136; 264/174
[58] Field of Search .............. 156/180, 181, 166, 433, 156/441; 264/136, 174; 425/112, 114; 118/124

[56] References Cited

U.S. PATENT DOCUMENTS

| | | | |
|---|---|---|---|
| 2,407,335 | 9/1946 | Wickwire, Jr. | 118/124 |
| 3,249,484 | 5/1966 | Courtney | 156/181 X |
| 3,737,352 | 6/1973 | Avis et al. | 156/181 |
| 3,993,726 | 11/1976 | Moyer | 264/174 |
| 4,549,920 | 10/1985 | Cogswell et al. | 156/181 |
| 4,610,402 | 9/1986 | Corbett et al. | 156/425 X |
| 4,626,306 | 12/1986 | Chabner et al. | 156/180 |
| 4,804,509 | 2/1989 | Angell et al. | 264/136 |
| 4,919,739 | 4/1990 | Dyksterhouse et al. | 156/181 |
| 5,094,883 | 3/1992 | Muzzy et al. | 427/434.6 X |
| 5,296,064 | 3/1994 | Muzzy et al. | 156/180 |

FOREIGN PATENT DOCUMENTS

| | | | |
|---|---|---|---|
| 550432 | 3/1993 | Japan | 156/180 |
| 1434926 | 5/1976 | United Kingdom | 118/124 |
| 422469 | 9/1974 | U.S.S.R. | 118/124 |

*Primary Examiner*—Jeff H. Aftergut
*Attorney, Agent, or Firm*—George F. Helfrich; Joy L. Bryant

[57] ABSTRACT

An apparatus and method were developed for providing a uniform, consolidated, unidirectional, continuous, fiber-reinforced polymeric material. The apparatus comprises a supply means, a forming means, a shaping means, and a take-up means. The forming means further comprises a pre-melting chamber and a stationary bar assembly. The shaping means is a loaded cooled nip-roller apparatus. Forming takes place by heating a polymeric prepreg material to a temperature where the polymer becomes viscous and applying pressure gradients at separate locations along the prepreg material. Upon exiting the forming means, the polymeric prepreg material is malleable, consolidated and flattened. Shaping takes place by passing the malleable, consolidated, flattened prepreg material through a shaped, matched groove in a loaded, cooled nip-roller apparatus to provide the final solid product.

6 Claims, 5 Drawing Sheets

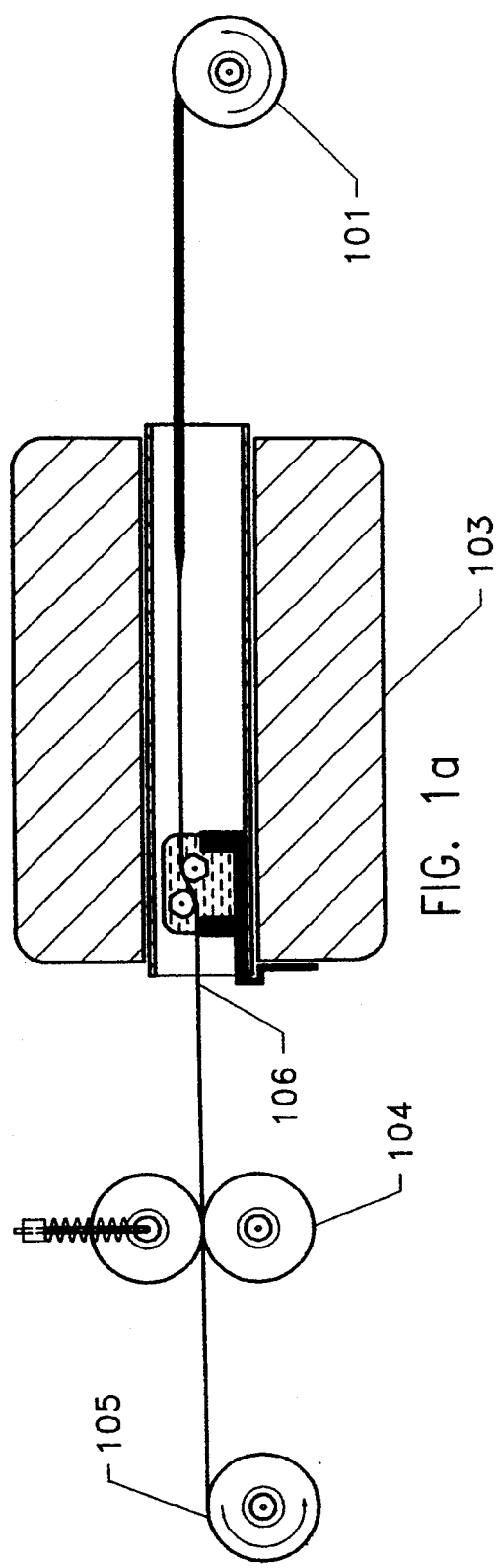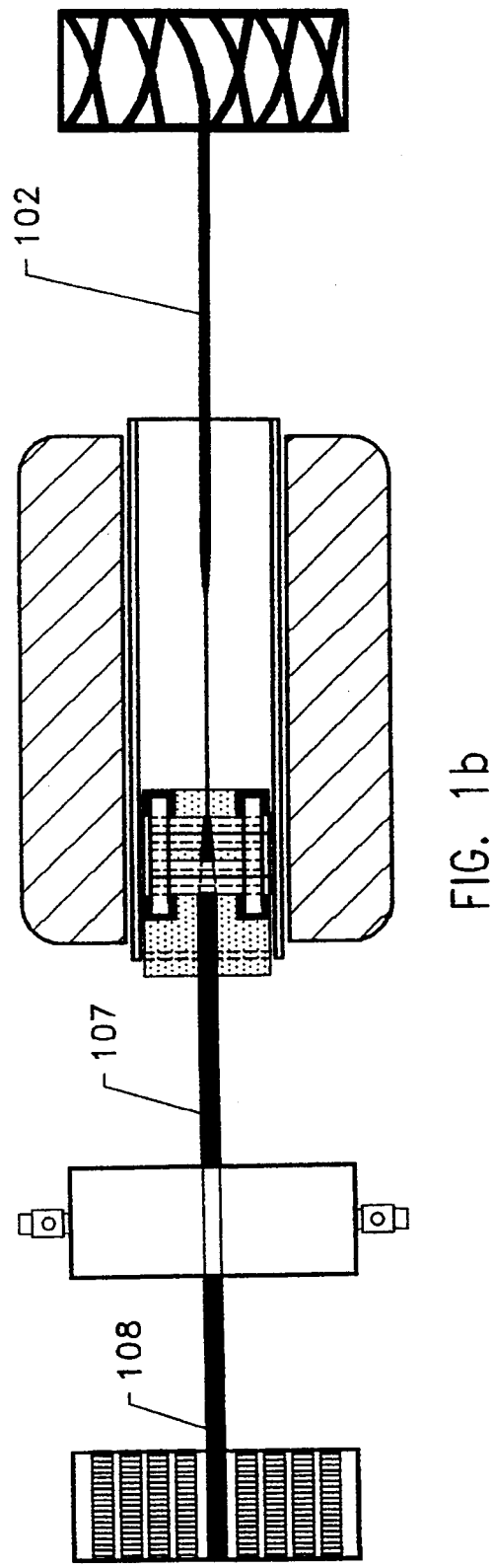

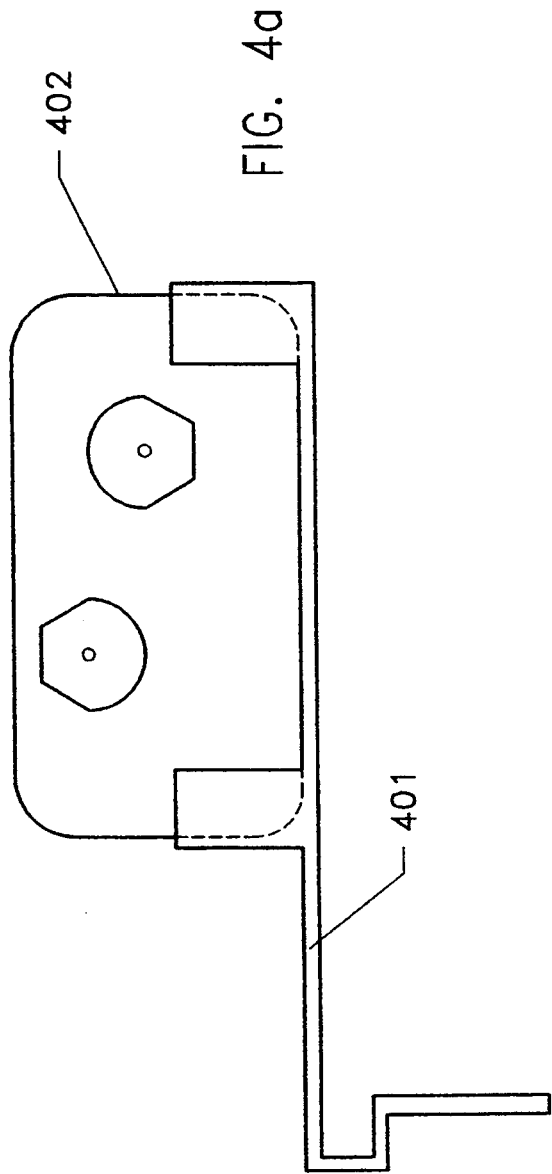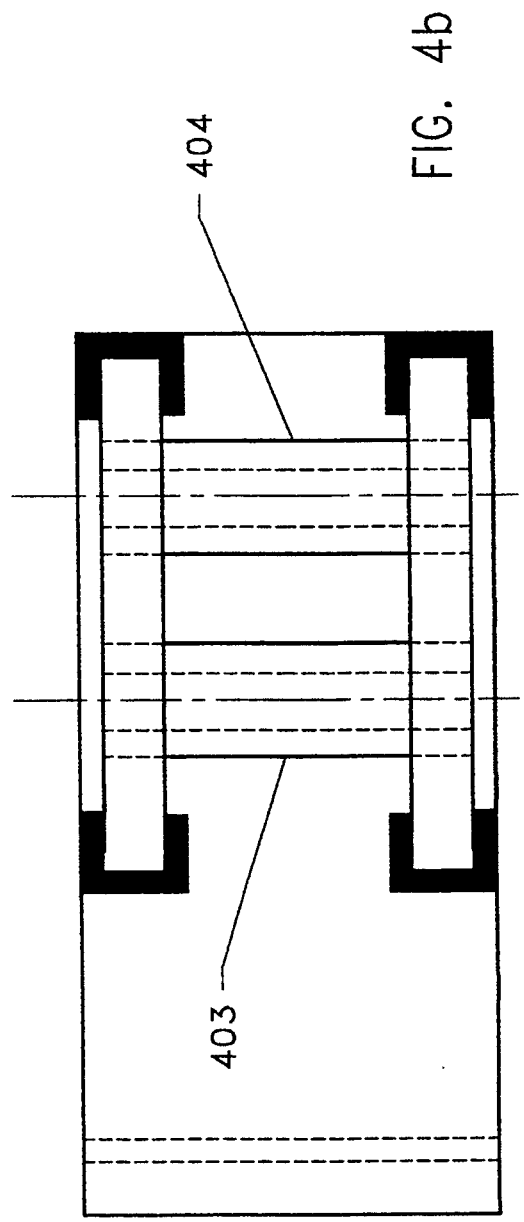

Zone 1 @ 475°C  Zone #2 @ 400°C  Zone #3 @ 475°C
Tool @ 7 (in.) Temperature = 330°C Sample Size = 27 @ 1 min. intervals

| (in) | Mean Temp. °C | Std. Dev. °C |
|---|---|---|
| 0 | 141 | 15.2 |
| 4 | 269 | 21.1 |
| 8 | 429 | 11.6 |
| 12 | 490 | 5.2 |
| 16 | 480 | 6.3 |
| 20 | 461 | 8.6 |
| 24 | 451 | 11.3 |
| 32 | 456 | 5.7 |
| 40 | 312 | 17.0 |
| 48 | 85 | 4.3 |

APPARATUS FOR CONSOLIDATING A PRE-IMPREGNATED, FILAMENT-REINFORCED POLYMERIC PREPREG MATERIAL

ORIGIN OF THE INVENTION

The invention described herein was made by a contract employee in the performance of work under NASA Grant Number NGT 51008 and is subject to the provisions of Public Law 96-517 (35 U.S.C. 202)in which the contractor has elected not to retain title.

CROSS-REFERENCE TO RELATED APPLICATIONS

This application is related to co-pending patent application Ser. No. 08/141,293, filed Oct. 20, 1993 entitled "Non-rectangular Towpreg Architectures".

BACKGROUND OF THE INVENTION

1. Field of the Invention

The present invention relates generally to an apparatus and a method for providing a uniform, consolidated, unidirectional, continuous, filament-reinforced polymeric material. In particular, it relates to an apparatus and a method using a pre-melting chamber, a stationary bar assembly, and a loaded, cooled nip-roller apparatus.

2. Description of the Related Art

Consolidation of voidy prepreg materials has been accomplished by pultrusion. Consolidation is defined as the elimination of voids during meltprocessing. This technique requires full ingestion of the unconsolidated prepreg within an enclosed die with an exit area less than the inlet area. Within the heated closed die, processing of the polymer forces the polymer melt to flow axially to the filament array, whereas flow transverse to the filament array is generally 1/10 to 1/100 of the axial flow. As a consequence of the geometry and boundary limits of the pultrusion die, voids must be expelled axially, against the flow of the prepreg via the entrance of the pultrusion die. This complex flow of voids is known to limit the rates at which pultrusion may proceed. With the desirable prepreg attribute of low void content, the pultrusion process is limited in the length of the die because the longer the die, the longer the voids must travel to be fully expelled. This contributes to a very slow production rate.

In U.S. Pat. No. 4,680,224 to O'Conner, a pultrusion process is disclosed wherein a poly(arylene sulfide) polymer matrix system is consolidated. O'Conner specifies pultruding powder-impregnated glass rovings and pultruding aqueous slurry impregnated fiber strands with a commercially available pultrusion apparatus where the production rates achieved 15 cm/minute. O'Conner states that a major operational problem of pultrusion is encountered at the die entrance, wherein fiber jamming was explained to cause catastrophic failure of the pultrusion process.

U.S. Pat. No. 2,702,408 to Hartland discloses a pultrusion apparatus with two separate dies, where one is heated and the other is cooled. U.S. Pat. No. 4,820,366 to Beever et al. discloses the further development of this concept to include a means of impregnation of dry filaments. However, this process is deficient because the process must be stopped occasionally to open the cooling die and massage the material and remove fiber balls.

O'Conner in U.S. Pat. No. 4,883,552 discloses a pultrusion process wherein ¼ inch diameter carbon fiber rods made from a carbon filament array slurry powder impregnated with polyphenylene sulfide polymer is pultruded. Production rates were noted at 15 inches per minute which are considered to be very slow.

The design of the present invention does not exhibit sensitivity to fiber jamming because no rigid die entrance is involved. Anomalies such as fiber balls and dry filament areas on the unconsolidated prepreg are allowed to pass freely through the processing apparatus and do not cause catastrophic failure of the process. By the present invention, processing rates for slurry powder coated polyimide thermoplastics have been achieved as high as 50 feet/minute for sustained time intervals of 45 minutes. Although viscous flow is commonly known to be faster axially than transverse to a filament array (estimated by a bank of adjacent cylinders), void expulsion occurs transverse to the filaments in the present invention because the unconsolidated prepreg material is flattened out which provides a short transverse distance for the voids to translate. Pultrusion facilitates void expulsion in the axial direction only, it cannot facilitate void expulsion in the transverse direction because the mold is solid at the top, bottom and two sides. In terms of required void translation distances, for the present invention, an axial void translation distance of 0.01 inch and a transverse distance of 0.005 inch are required, whereas for pultrusion an axial void translation distance of 4 inches is common.

SUMMARY OF THE INVENTION

An object of the present invention is to provide a uniform, consolidated, unidirectional, continuous, filament-reinforced polymeric prepreg material using an apparatus and method which do not require the use of a die.

Another object is to form a consolidated prepreg material by applying a plurality of pressure gradients at separate locations to a polymeric prepreg material.

Another object is to shape a consolidated polymeric prepreg material using a loaded, cooled nip-roller apparatus which has a pair of matched grooves between the upper and lower rolls.

These and other objects of the invention were achieved by the present invention. In the present invention, a uniform, consolidated, unidirectional, continuous, filament-reinforced polymeric prepreg material was prepared by an apparatus which does not require the use of a die or other pultrusion methods. The apparatus comprises a supply means for supplying a unidirectional, continuous, filament-reinforced polymeric prepreg material. From the supply means, the polymeric prepreg material passes through a forming means where it is consolidated and pre-shaped to a wide, flat, cross-sectional form. The forming means is housed within a tube furnace having a steel tube liner having entry and exit sides. A pre-melting chamber is located within the steel tube liner at the entry side and a stationary bar assembly is located in the steel tube liner near the exit side. The stationary bar assembly comprises a bar fixture supporting a plurality of bar templates. The bar templates further support at least one pair of stationary bars. The stationary bars are oriented substantially perpendicularly to the polymeric prepreg material in its axial direction. When the polymeric prepreg material passes through the stationary bar assembly, a plurality of pressure gradients are applied to separate locations along the polymeric prepreg material. Upon exiting the stationary bar assembly, the material is consolidated into a malleable, wide, flat, cross-sectional form.

A shaping means is spaced in an operable relationship to the forming means for reshaping the malleable, consolidated, flattened polymeric prepreg material. The shaping means comprises a loaded, cooled nip-roller apparatus. This apparatus has a pair of rollers forming a nip point and having a shaped, matched groove at the nip point which reshapes the malleable, consolidated, flattened polymeric prepreg material into a solid, uniform, consolidated, unidirectional, continuous, filament-reinforced polymeric material.

A take-up means is used to pull the polymeric prepreg material from the supply means, through the forming means, through the shaping means, and taking-up the solid, uniform, consolidated, unidirectional, continuous, filament-reinforced polymeric material.

A method for providing a uniform, consolidated, unidirectional, continuous, filament-reinforced polymeric material was developed for use with the apparatus. This method involves, providing a unidirectional, continuous, filament-reinforced polymeric prepreg material. Heating the polymeric prepreg material to a temperature which causes the polymer to pass from a solid state to a viscous liquid. The heated polymeric prepreg material is passed over a first stationary bar and under a second stationary bar wherein pressure gradients are imposed on the polymeric prepreg material which consolidate and flatten the polymeric prepreg material. The malleable, consolidated, flattened polymeric prepreg material is reshaped by passing the polymeric prepreg material through a shaped, matched groove in a loaded, cooled nip-roller apparatus to from a solid, uniform, consolidated, unidirectional, continuous, filament-reinforced polymeric material. The resulting filament-reinforced polymeric materials of this invention include prepreg ribbon and prepreg tape.

BRIEF DESCRIPTION OF THE DRAWINGS

FIG. 1a is a side view of the apparatus.
FIG. 1b is a top view of the apparatus.
FIG. 4a is a side view of the stationary bar assembly.
FIG. 4b is a top view of the stationary bar assembly.

DESCRIPTION OF THE PREFERRED EMBODIMENTS

Figure 2A:
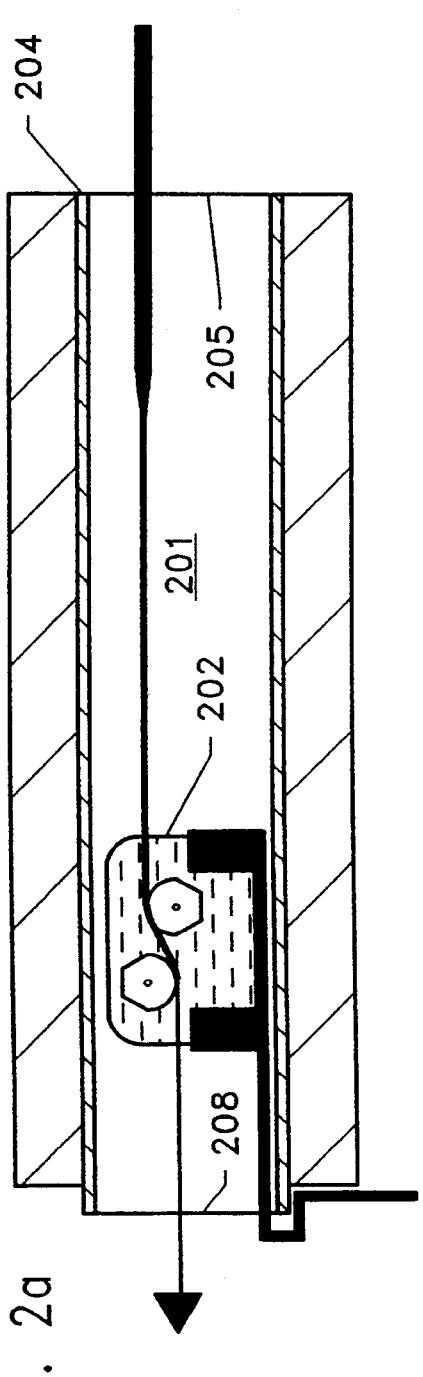
FIG. 2a is a side view of the forming means.

The present invention is unique because it does not require the use of dies. In contrast to the heated die commonly used in pultrusion, this process utilizes a melt processing method with contact occurring at separate locations along the polymeric prepreg material. In contrast to the cool die commonly used in pultrusion, the present invention utilizes a loaded, cooled nip-roller apparatus which applies only normal forces to the consolidated material and therefore does not cause filament tearing or bailing. Furthermore, this invention is robust in the sense that anomalies in the unconsolidated prepreg material such as fiber balls, dry filament areas, and stray filament ends do not cause catastrophic failure of the process but are allowed to proceed freely to be removed later when the polymeric prepreg material is in the solid state.

The prepreg material is a plurality of continuous filament arrays (typically composed of 6,000 to 12,000 filaments) which have been previously impregnated with some melt-processible polymer. Impregnation methods include: 1) dry-powder prepregging, 2) water-slurry powder prepregging, 3) solution dip-pan prepregging, and 4) hot-melt prepregging.

Referring now to the drawings. In FIGS. 1a and 1b, the supply means 101 delivers the incoming unidirectional, continuous, filament reinforced polymeric prepreg material 102. This material is partially unconsolidated with some volume percentage occupied by air or other gaseous voids. In an alternative embodiment for the supply means, a uniform tensioning device or accumulator, may be included to ensure a consistent and uniform back-tension to aid processing. The voids are a consequence of the prepreg quality and type of manufacturing technique and are commonly accepted to occupy a range of shapes (spheres and slugs) and sizes (1 to 100 filament diameters). Expulsion of these voids is a primary objective for this invention. The prepreg material is pulled through the forming means 103 and the shaping means 104 by the take-up means 105 which applies a steady tension to the filament array.

Figure 2B:
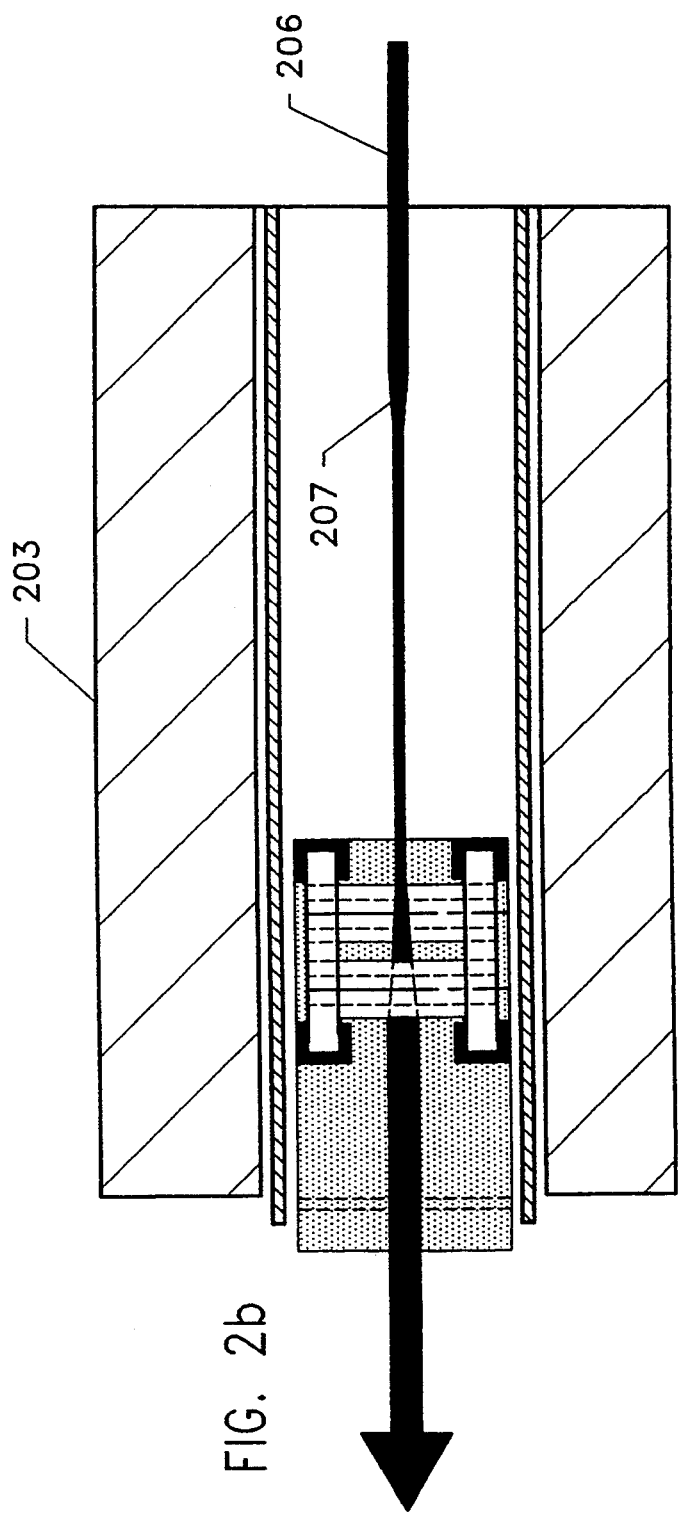
FIG. 2b is a top view of the forming means.

The forming means (FIGS. 2a and 2b) comprises a pre-melting chamber 201 and a stationary bar assembly 202, both of which are housed within a tube furnace 203 having a steel tube liner 204. The pre-melting chamber 201 is located within and is first encountered at the entrance to the tube furnace 205. Within the pre-melting chamber, the polymer component of the prepreg material 206 melts from the solid phase to a viscous liquid phase which causes a liquid wetting phenomenon, reducing the void content and resulting in a neck-down region 207 on the prepreg material. The continuous filament array component of the prepreg material remains solid and continues to support 100% of the pulling tension. Near the exit 208 of the controllable tube furnace is the stationary bar assembly 202. This assembly (FIGS. 4a and 4b) comprises a bar fixture 401, a plurality of bar templates 402, and at least two stationary bars 403, 404 fixed perpendicular to the polymeric prepreg material in its axial direction. The bars must have at least one side with a curved surface for contact with the polymeric prepreg material. For example, the curvature may be circular or elliptical. The bars may be constructed of materials which maintain structural integrity at temperatures above the processing temperature of the polymer component of the prepreg material. Some examples of materials which may be used for the bars include: polished quartz, high nickel alloy metal, bulk carbon graphite and ceramic. The geometry of the stationary bars and the bar templates controls the resulting pressure gradients which are applied to the prepreg material by the stationary bar assembly. The geometry can be adjusted to affect the pressure gradients. Accordingly, examples of such adjustments and affects include: 1) increasing the bar surface curvature radius decreases the applied pressure gradients; 2) increasing the center line distance between each contact radius center of each stationary bar decreases the applied pressure gradients; 3) increasing the angle defined by the center line and the polymeric prepreg material increases the applied pressure gradients. The polymeric prepreg material is pulled over a first stationary bar 404 and under a second stationary bar 403 wherein a first pressure gradient is applied to the lower side of the polymeric prepreg material at the point where it passes over the first stationary bar and a second pressure gradient is applied to the upper side of the polymeric prepreg material at the point where the material passes under the second stationary bar. The application of these pressure gradients allows for the expulsion of voids and the redistribution of the polymer and the filaments, causing the polymeric prepreg material to become a consolidated, wide, flat, cross-sectional form 106(FIG. 1a).

After the consolidated, flattened polymeric prepreg material exits the forming means, the polymer component of the prepreg material is in a transition from a viscous liquid to a state described as a malleable plastic solid. The consolidated, flattened, malleable polymeric prepreg material 107 then enters the shaping means 104. The shaping means 104 is placed in an operable relationship to the forming means 103. This relationship allows enough distance from the forming means for the polymeric prepreg material to cool yet remain malleable upon entrance into the shaping means.

Figure 3:
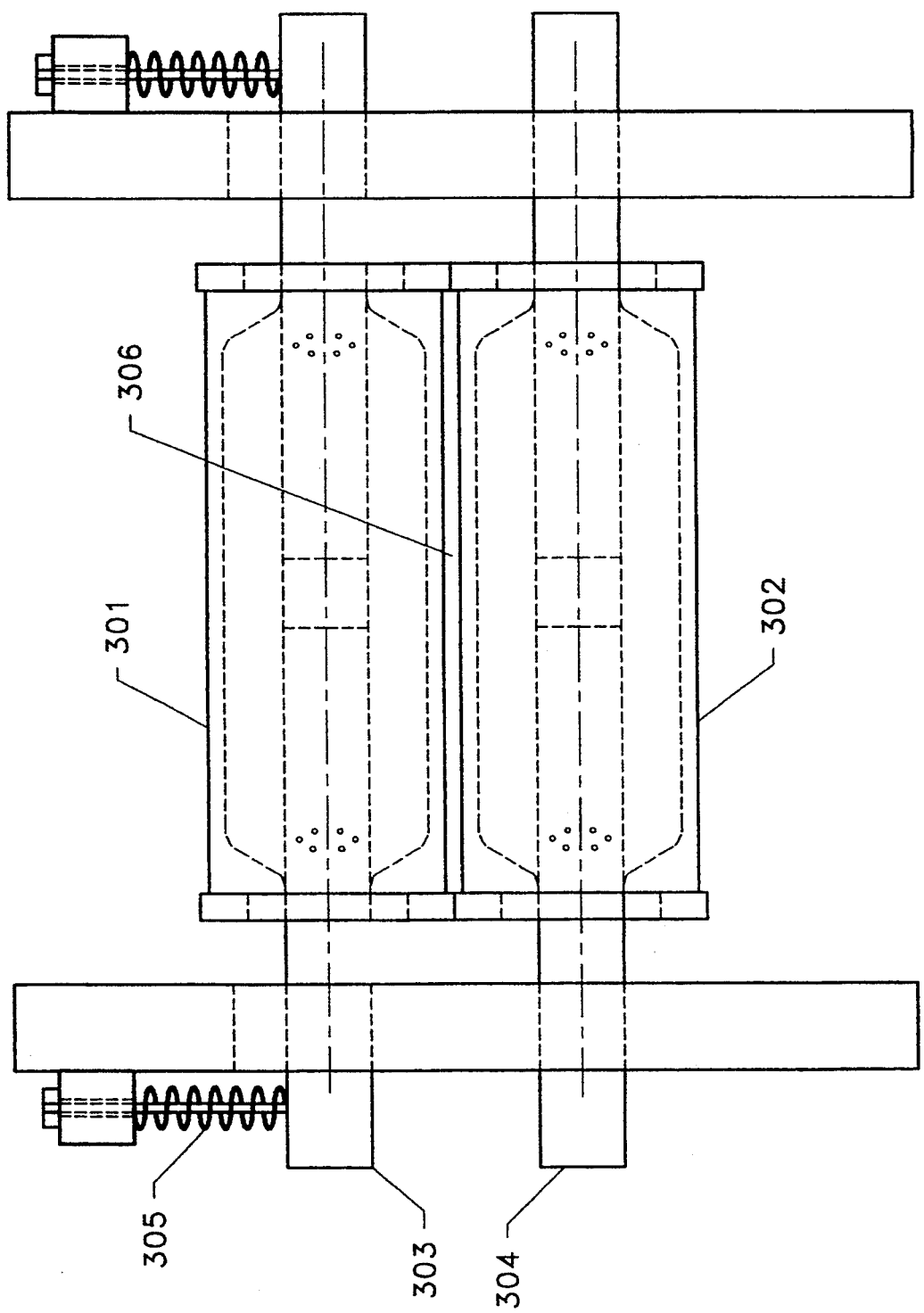
FIG. 3 is a front view of the loaded, cooled nip-roller apparatus.

The shaping means 104 is a loaded, cooled nip-roller apparatus. This apparatus (FIG. 3) is comprised of two hollow, matched, grooved nip-rollers 301, 302 which are actively cooled under forced convection via load bearing shafts 303, 304. One of the rollers 301 is loaded 305 against a fixed roller 302. By the present invention the type of load applied was a spring load, however, a pneumatic load can also be used. The resilient loading allows for passing of anomalies, such as filament balls, in the consolidated, flattened, malleable polymeric prepreg material. Under the load applied by the loaded nip-rollers 301, 302 and the thermal gradient imposed by the cool roller surfaces, the malleable plastic solid undergoes transition to a solid elastic state and the polymeric prepreg material is shaped to that which is defined by the gap 306 between the two nip-rollers. An advantage to having the nip-rollers cool is that no release paper is required. The hot sticky polymer melt is quickly solidified (1/10 to 1/1000 second) on contact with the cool nip-rollers. Because the thermal shrinkage which occurs with the polymer phase change is larger than the thermal expansion of the rollers, the polymer prepreg material is able to release from the roller. The gap 306 which is used to form the final shape of the polymeric prepreg material may be designed to accommodate a variety of shapes, such as triangular, rectangular and circular. The shaped, polymeric material is consolidated and its cross-section is uniform along its length.

Referring now to FIGS. 1a and 1b, a take-up means 105, such as a take-up puller, spools the polymeric material. Examples of the final filament-reinforced polymeric materials include, prepreg ribbons, prepreg tapes, alternate cross-sectioned prepreg ribbons and braided prepreg ribbons. These prepreg materials may be used in forming composite parts.

The following are examples which illustrate the apparatus and method of the present invention. These examples are merely illustrative and intended to enable those skilled in the art to practice the invention in all of the embodiments flowing therefrom, and do not in any way limit the scope of the invention as defined in the claims.

EXAMPLE 1

The apparatus and method of the present invention was used to convert a fully imidized polyimide powder slurry-coated 12K carbon towpreg into a uniform, solid, consolidated, unidirectional, continuous, polymeric prepreg ribbon.

Figure 5:
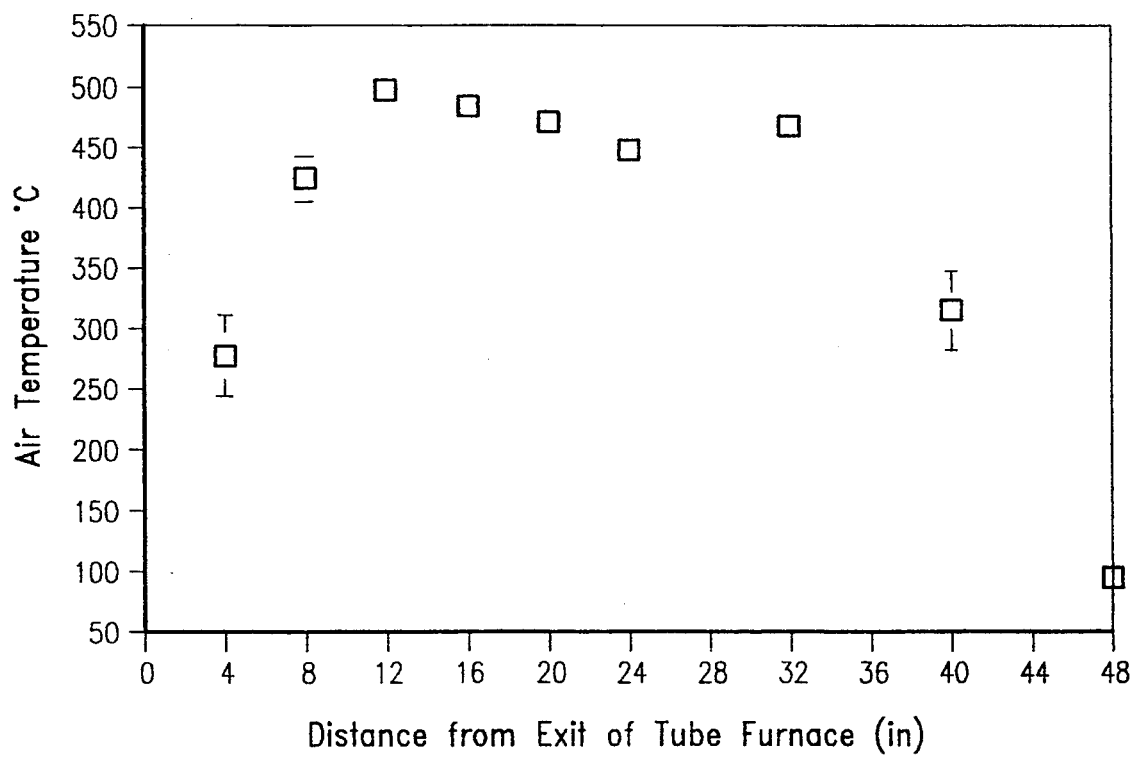
FIG. 5 is a linear temperature profile for the forming means.

The fully imidized polyimide slurry powder coated 12K carbon towpreg, Aurum-500/I-M 8, which is available in research quantities from Cytec Engineering Materials, was provided. No solvents, plasticizers, or other flow enhancing additives were used in this process. The stationary bar assembly geometry was defined as having a bar contact radius of 5 mm, a radius centerline distance of 16.5 mm, and a centerline angle of 10°. The bar templates were constructed of an ablative ceramic insulator material. The stationary bars were constructed of bulk carbon graphite. The pre-melting tube furnace air temperature profile is described by FIG. 5. The bar surface temperatures were 330° C. which was achieved by passive heating from the pre-melting chamber and was stabilized within 10 minutes. The cooled, loaded nip-roller apparatus was cooled by dry shop air flow through the apparatus and was regulated by pressure which was maintained at 15 psig. The load was applied by a spring. The groove in the two rollers was designed such that the open space at the nip contact allowed for a finished part with a cross-section defined by $\frac{1}{8}$ inch wide by 0.0075 inches thick. The take-up rate was set at a constant 45 feet per minute. The towpreg was threaded through the apparatus, the tension applied to the towpreg yarn at the take-off spool was set to 450 grams, and the tension on the ribbon at the take-up was observed to be 1400 grams. The process was run for approximately 30 minutes. The resulting ribbon was of superior quality and consistency along its entire length. No hair balls occurred, and no stoppages occurred. Upon clean-up, it was observed that no surface abrasion had damaged the carbon graphite bars which allowed the bars to be available for continued reuse.

EXAMPLE 2

The apparatus and method of the present invention is used to convert a plurality of fully imidized polyimide powder slurry-coated 12K carbon towpregs into a 3 inch uniform, consolidated, unidirectional, continuous, polymeric prepreg tape.

The fully imidized polyimide powder slurry-coated 12K carbon towpreg, Aurum-500/IM-8, which is available in research quantities from Cytec Engineering Materials, was provided. No solvents, plasticizers, or other flow enhancing additives are required for this process. The stationary bar assembly geometry is defined as having a bar contact radius of 5 mm, a radius centerline distance of 16.5 mm, and a centerline angle of 10°. The bar templates are constructed of a steel material. The stationary bars are constructed of fired ceramic. The bar surface temperatures are 330° C. which is achieved by passively heating from the pre-melt chamber. The groove in the two rollers is designed such that the open space at the nip contact allows for a finished part with a cross-section defined as 3 inches wide by 0.0075 inches thick. The take-up rate is set at a constant 30 feet per minute. The towpregs are threaded through the apparatus, the tension applied to each towpreg yarn at the take-off spool is 450 grams, and the tension on the tape at the take-up is 10 kg. The process is run for approximately 30 minutes to yield a 3 inch, uniform, consolidated, uidirectional, continuous, polymeric prepreg tape.

What is claimed as new and desired to be secured by Letters Patent of the United States is:

1. An apparatus for consolidating a pre-impregnated, filament-reinforced polymeric prepreg material, wherein the apparatus comprises:

(a) a supply means for delivering a pre-impregnated, filament-reinforced polymeric prepreg material;

(b) a forming means, spaced in an operable relationship to the supply means, for expelling voids and pre-shaping the pre-impregnated, filament-reinforced polymeric prepreg material into a malleable, wide, flat cross-sectional form, wherein the forming means comprises a tube furnace, a steel tube liner having an entry side and an exit side disposed within the tube furnace, a pre-melting chamber disposed within the steel tube liner near the entry side, and a stationary bar assembly disposed within the steel tube liner near the exit side;

(c) a shaping means, spaced in an operable relationship to the forming means, for re-shaping the malleable, wide, flat pre-impregnated, filament-reinforced polymeric prepreg material into a solid, shaped, consolidated, filament-reinforced polymeric material, wherein the shaping means is a loaded, convection cooled, nip-roller apparatus comprising two hollow, matched, grooved rollers forming a nip point wherein one of the rollers is loaded against a fixed roller; and (d) a take-up means for pulling the pre-impregnated, filament-reinforced polymeric prepreg material from the supply means, through the forming means and the shaping means, and taking up the solid, shaped, consolidated, filament-reinforced polymeric material.

2. The apparatus of claim 1, wherein the stationary bar assembly comprises: a bar fixture supporting a plurality of bar templates which bar templates further support at least one pair of stationary bars, wherein the bars are oriented substantially perpendicularly to the pre-impregnated filament-reinforced polymeric material in its axial direction.

3. The apparatus of claim 2, wherein the stationary bars are comprised of bulk carbon graphite.

4. The apparatus of claim 2, wherein the stationary bars are comprised of ceramic.

5. The apparatus of claim 2, wherein the stationary bars are comprised of high nickel alloy.

6. An apparatus for consolidating a pre-impregnated, filament-reinforced polymeric prepreg material, according to claim 1, further comprising a uniform tensioning device cooperating with the supply means, whereby the uniform tensioning device ensures a consistent and uniform back-tension to aid processing.

* * * * *